(12) United States Patent
Elliott

(10) Patent No.: US 7,317,876 B1
(45) Date of Patent: Jan. 8, 2008

(54) MEDIUM ACCESS CONTROL FOR RETRO-REFLECTORS

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 683 days.

(21) Appl. No.: 10/786,336

(22) Filed: Feb. 26, 2004

(51) Int. Cl.
*H04B 10/00* (2006.01)

(52) U.S. Cl. .................... 398/170; 398/140; 398/169; 398/165

(58) Field of Classification Search ............... 398/169, 398/170, 78
See application file for complete search history.

(56) References Cited

U.S. PATENT DOCUMENTS

| | | | | |
|---|---|---|---|---|
| 4,143,263 A * | 3/1979 | Eichweber | ............... | 398/170 |
| 4,662,003 A * | 4/1987 | Eichweber | ............... | 398/170 |
| 4,777,660 A * | 10/1988 | Gould et al. | ............... | 398/170 |
| 4,887,310 A * | 12/1989 | Meyzonnette et al. | ...... | 398/170 |
| 4,941,205 A * | 7/1990 | Horst et al. | ............... | 398/168 |
| 4,983,021 A * | 1/1991 | Fergason | ............... | 349/1 |
| 5,117,301 A * | 5/1992 | Tsumura | ............... | 398/170 |
| 5,819,164 A * | 10/1998 | Sun et al. | ............... | 455/106 |
| 6,115,168 A * | 9/2000 | Zhao et al. | ............... | 359/247 |
| 6,154,299 A | 11/2000 | Gilbreath et al. | ............ | 359/170 |
| 6,624,916 B1 * | 9/2003 | Green et al. | ............... | 398/169 |
| 6,791,472 B1 * | 9/2004 | Hoffberg | ............... | 340/905 |
| 6,816,546 B1 * | 11/2004 | Raleigh et al. | ............ | 375/225 |
| 7,142,348 B2 * | 11/2006 | Sayyah et al. | ............... | 359/291 |
| 2002/0031199 A1 * | 3/2002 | Rolston et al. | ............ | 375/356 |
| 2002/0176390 A1 * | 11/2002 | Sparr et al. | ............... | 370/338 |
| 2004/0208602 A1 * | 10/2004 | Plante | ............... | 398/140 |
| 2006/0007885 A1 * | 1/2006 | Pollack et al. | ............ | 370/328 |
| 2006/0291864 A1 * | 12/2006 | Pavelchek | ............... | 398/129 |

OTHER PUBLICATIONS

W. S. Rabinovich et al.; "InGaAs Multiple Quantum Well Modulating Retro-reflector for Free Space Optical Communications"; Proceedings of the SPIE, 4485; 2001; 13 pages.

* cited by examiner

*Primary Examiner*—Kenneth Vanderpuye
*Assistant Examiner*—Thi Q. Le
(74) *Attorney, Agent, or Firm*—Ropes & Gray LLP

(57) ABSTRACT

A method, a device and a system for communications to and from a retro-reflector device (302) is provided. The retro-reflector device (302) receives a first frame (400) encoded in an input beam (106). The retro-reflector device (302) creates and sends a second frame (420) in a first reflected beam (108) formed by the retro-reflector device (302) reflecting the input beam (106) along a path closely aligned with a path of the input beam. At least one of the first frame (400) and the second frame (420) includes medium access control information. In some implementations, the first frame (400) may include a data throughput rate (404, 406), a preamble (402) and an error correction code (412).

57 Claims, 6 Drawing Sheets

MEDIUM ACCESS CONTROL FOR RETRO-REFLECTORS

TECHNICAL FIELD

The invention relates to the field of communications and, more particularly, to systems and methods that send and receive data using modulated retro-reflectors.

BACKGROUND OF THE INVENTION

Systems that use modulating retro-reflectors for communications are well-known. One existing system employs modulating retro-reflectors to communicate optically and provides secure, high-speed data communications. However, existing communications systems that employ modulating retro-reflectors do not provide a flexible access control method for controlling communications among a probe device and a group of retro-reflectors, such that each of the retro-reflectors may receive schedule information regarding when respective retro-reflectors may be interrogated for data or may receive data. Further, a need exists for a system that permits a schedule for exchanging data between the probe device and any one of the retro-reflectors to be adjusted based on conditions, such as an amount of data to send or urgency of data.

SUMMARY OF THE INVENTION

Systems and methods consistent with the principles of the invention provide a medium access control method for use in communication systems that employ retro-reflectors.

In a first aspect of the invention, a communication method is provided for a retro-reflector device. The retro-reflector device receives a first frame encoded in an input beam. The retro-reflector device creates and sends a second frame in a first reflected beam formed by the retro-reflector device reflecting the input beam along a patch closely aligned with a path of the input beam. At least one of the first frame and the second frame includes medium access control information.

In a second aspect of the invention, a retro-reflector device is provided. The retro-reflector device includes a receiving portion configured to receive an incoming beam from a device and to decode a first frame included in the incoming beam. The first frame includes schedule an indication of a next time for the retro-reflector device to receive an incoming beam.

In a third aspect of the invention, a device that is configured to send an incoming beam to at least one retro-reflector device is provided. The device includes a transmitter and a receiver. The transmitter is configured to provide a carrier as an incoming beam to at least one retro-reflector device and to encode a first frame onto the carrier. The receiver is configured to receive and decode a reflected beam, including a second frame, from the at least one retro-reflector device. One of the first frame and the second frame includes medium access control information.

In a fourth aspect of the invention, a system is provided for controlling communications. The system includes a probe device and a group of retro-reflector devices. The probe device is configured to send a first frame modulated onto a carrier as an incoming beam. Each of the retro-reflector devices is configured to encode and modulate a second frame onto a reflected beam, responsive to receiving the first frame in the incoming beam, and transmit the second frame to the probe device. One of the first frame and the second frame includes medium access control information.

In a fifth aspect of the invention, a retro-reflector device is provided. The retro-reflector device includes means for receiving and decoding a first frame in an incoming beam from a remote device and means for forming a reflected beam by reflecting the incoming beam along a path closely aligned with a path of the incoming beam and for encoding a second frame in the reflected beam. One of the first frame and the second frame includes medium access control information.

In a sixth aspect of the invention, a machine-readable medium is provided. The machine-readable medium has recorded thereon, instructions for at least one processor of a retro-reflector device. When the instructions are executed by the at least one processor, the at least one processor is configured to: receive an incoming beam from a remote device and decode a first frame included in the incoming beam; and form a reflected beam by reflecting the incoming beam along a path closely aligned with a path of the incoming beam and encode a second frame in the reflected beam. At least one of the first frame and the second frame includes medium access control information.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Operating Environment

Figure 1:
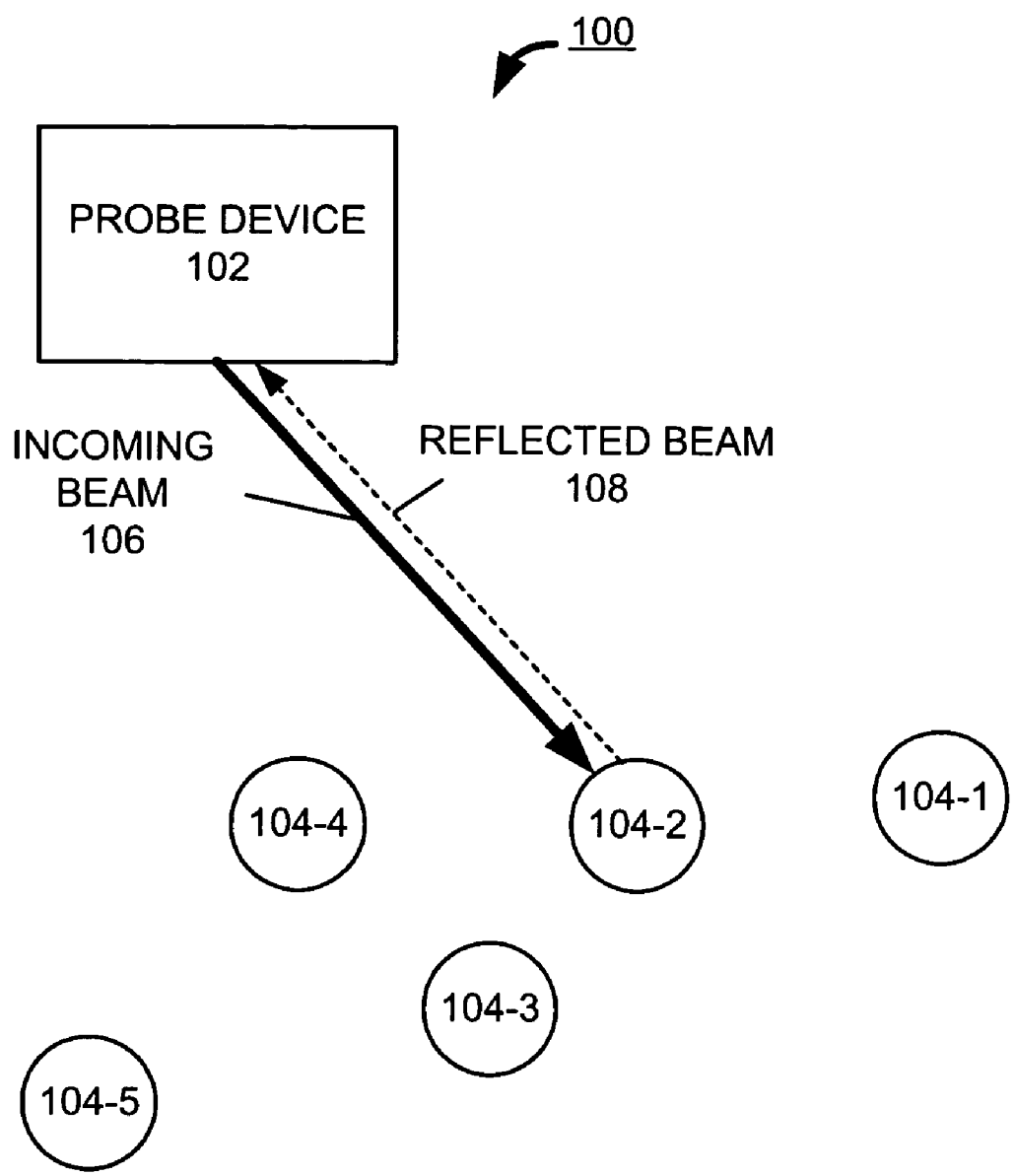
FIG. 1 illustrates an exemplary system consistent with principles of the invention.

FIG. 1 illustrates an exemplary system 100 consistent with the principles of the invention. System 100 may include a probe device 102 and a group of retro-reflectors 104-1 to 104-5 (collectively referred to as 104). It will be appreciated that a typical system could include more or fewer devices than are shown in FIG. 1.

Probe device 102 may include any conventional device capable of transmitting a beam to retro-reflector 104 and receiving a reflected beam from retro-reflector 104. The beam may be implemented by light, radio frequency waves, acoustic waves, or any other mechanism that can act as a carrier and be reflected. When probe device 102 desires to interrogate retro-reflectors 104, probe device 102 may generate an incoming beam 106 and direct incoming beam 106 toward any one of retro-reflectors 104. A receiving retro-reflector 104 may encode and modulate data onto a reflected beam 108 reflected back to probe device 102. Probe device 102 may receive and decode the data transmitted via reflected beam 108.

Probe device 102 also may send data to any of retro-reflectors 104 by transmitting a modulated incoming beam 106 to any one of retro-reflectors 104. Probe device 102 may modulate incoming beam 106 by, for example, on-off keying, when the beam includes light waves. Retro-reflector 104 may sense the modulation and decode the "zeros" and "ones" encoded in incoming beam 106.

Probe device 102 may include one or more processors (not shown) and a memory (not shown) for processing information sent to and received from retro-reflector 104. Retro-reflectors 104 may be attached to, for example, sensors, actuators or network-enabled computers.

System 100 may be outdoors. For example, probe device 102 may be located in, for example, an aircraft or a satellite, and retro-reflectors 104 may be located, for example, on the ground, in trees, on top of buildings, etc. Alternatively, system 100 may be indoors. For example, probe device 102 may be located in a ceiling mount and retro-reflectors may be attached to various points of a room or hallway, such as, for example, on thermometers, vibration sensors, microphones, controls or actuators, etc.

Although system 100 is described as using an optical retro-reflector, retro-reflectors that reflect and modulate a number of media may be used. For example, retro-reflectors 104 may receive and modulate beams of acoustic waves, radio frequency (RF) waves, or any other carriers that can be reflected, including light waves.

Exemplary Configuration

Figures 2A, 2B:
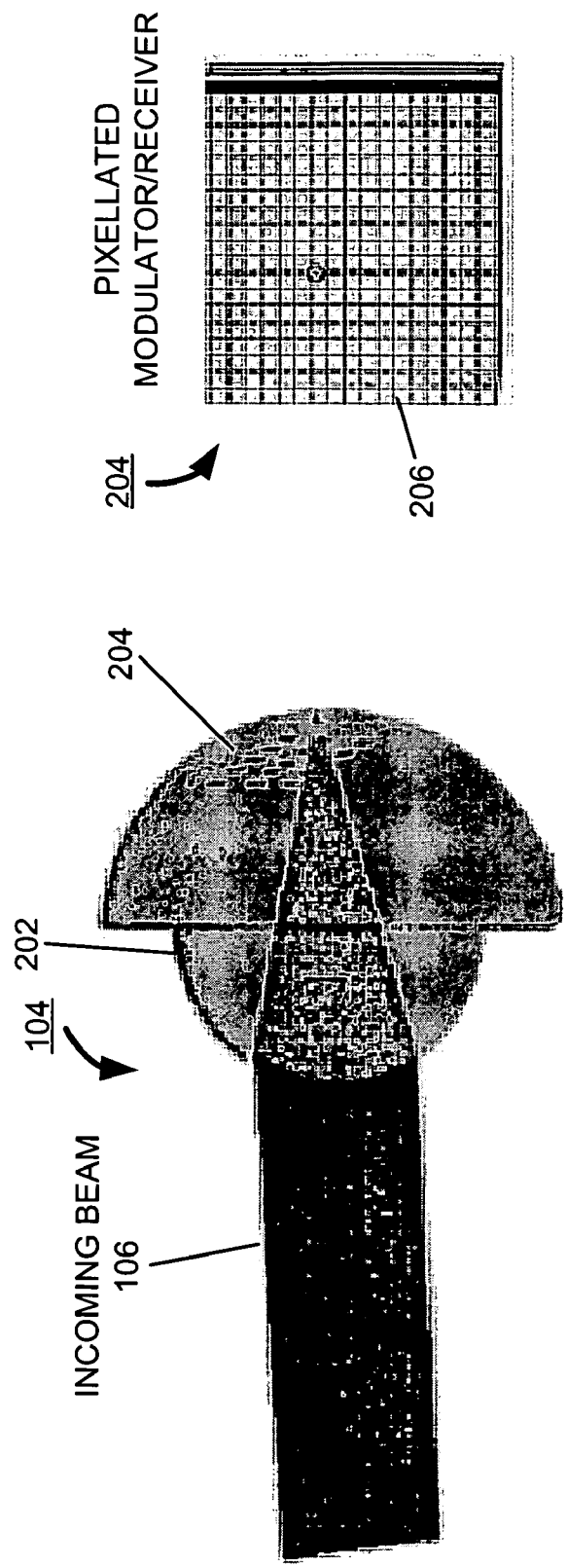
FIGS. 2A and 2B show a prior art retro-reflector that may be used in implementations consistent with the principles of the invention.

A number of different types of retro-reflectors 104 may be used in implementations consistent with the principles of the invention. FIGS. 2A-2B illustrate an exemplary prior art retro-reflector 104 that may be used in implementations consistent with the invention. Retro-reflector 104 may include any type of well-known arrangement capable of reflecting incoming beam 106 back as a reflected beam 108 in such a way that reflected beam 108 follows a path very closely aligned with that of the incoming beam 106. Retro-reflector 104 may be, for example, a cat's eye retro-reflector, as shown in FIGS. 2A-2B. Retro-reflector 104 may include a lens 202 and a modulator/receiver, such as a pixellated modulator/receiver 204. Lens 202 may have a field of view (FOV) of, for example, 30 degrees. In exemplary retro-reflector 104 of FIG. 2A, incoming beam 106 may be, for example, light waves that may have a wavelength of about 1550 nanometers.

Pixellated modulator/receiver 204 may include a group of quantum wells 206 arranged in pixels, as illustrated in FIG. 2B. Each quantum well 206 of pixellated modulator/receiver 204 may have an area of, for example, 1 square millimeter, which can be made to have a reflective or a non-reflective surface. Thus, pixellated modulator/receiver 204 may modulate data onto a reflected beam 108 by changing the reflectivity of individual quantum wells 206. For example, a reflective surface of quantum well 206 may indicate a "1" value, while a non-reflective surface may indicate a "0" value, or vice versa. A remote device, such as probe device 102, may provide incoming beam 106 and may observe modulated reflected beam 108.

Each quantum well 206 may include a positive-intrinsic-negative (PIN) diode (not shown) and therefore, may act as a photodetector that can sense whether it is being struck by incoming beam 106, which may be a high power optical beam from a laser or other source. As previously mentioned, probe device 102 may modulate data by, for example, on-off keying, in which on (the presence of incoming beam 106) may represent a "1" value and off (the absence of incoming beam 106) may represent a "0" value, or vice versa. Retro-reflector 104 may sense the modulation via the PIN diodes of quantum wells 206.

Figure 3:
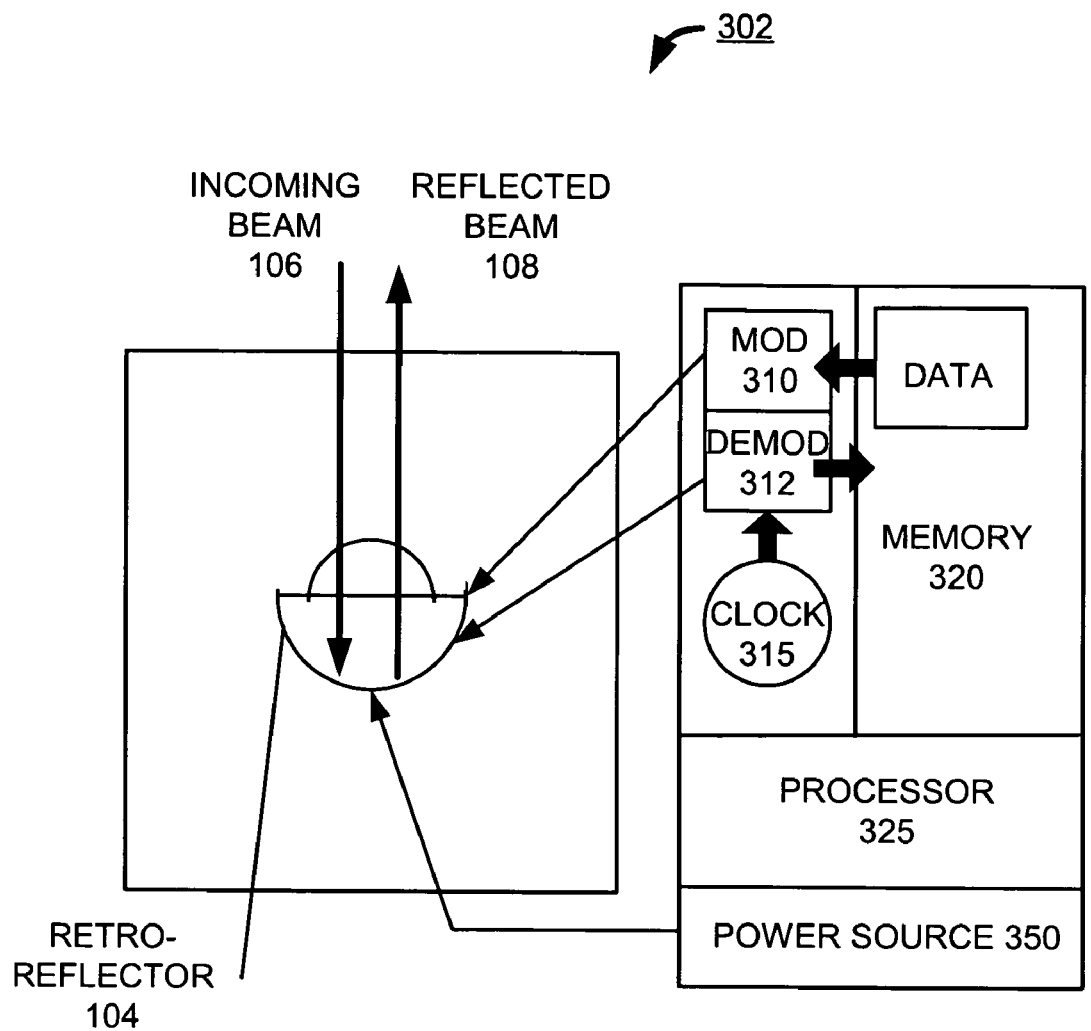
FIG. 3 illustrates an exemplary retro-reflector device that may be used in implementations consistent with the present invention.

FIG. 3 illustrates an exemplary retro-reflector device 302 that may be used in implementations consistent with the principles of the invention. Retro-reflector device 302 may include retro-reflector 104, a modulator 310, a demodulator 312, a clock 315, a memory 320, a processor 325, and a power source 350.

Retro-reflector 104 may receive messages via incoming beam 106 and may transmit messages via reflected beam 108, as previously discussed. Incoming beam 106 may include a carrier signal generated at a distant communicating device, such as distant probe device 102 (FIG. 1). Incoming beam 106 may be, for example, implemented by light, radio-frequency waves, acoustic waves, or any other mechanism that can act as a carrier and be reflected.

Reflected beam 108 represents the reflection of incoming beam 106 after being reflected by retro-reflector 104. It will be appreciated that reflected beam 108 may be, more or less, a full strength reflection of incoming beam 106, a substantially weakened (in amplitude) reflection, or any variation in between. Incoming beam 106 may also be altered in other ways, e.g., in phase or in polarity. Furthermore, reflected beam 108 may be entirely absent, i.e., when retro-reflector 104 is disabled. These alterations in reflected beam 108 may be used to encode retro-reflector's 104 transmission of bits.

Modulator 310 may include any type of conventional modulator capable of modulating the state of retro-reflector 104, for example, via quantum wells 206 of a cat's eye retro-reflector, so as to vary reflected beam 108 in such a way to allow for the detection of the different variations. In its simplest form, modulator 310 might represent a 0 bit as a non-reflected beam, and a 1 bit as a reflected beam. This is a simple on/off type of scheme. More complex modulation techniques are also possible (e.g., brighter/darker, coherent/incoherent, changes in phase, changes in polarization, etc.). Such modulation techniques are well known in the communications field.

Demodulator 312 may include any type of conventional demodulator capable of demodulating data encoded in incoming beam 106. As described above, incoming beam 106 may be modulated via, for example, on-off keying. Thus, for example, PIN diodes (not shown) within each quantum well 206 may detect the presence or absence of incoming beam 106. Signals representing the presence or absence of incoming beam 106 may be input to demodulator 312 from each quantum well 206. Demodulator 312 may then reconstruct data from the signals.

Clock 315 may include a conventional clocking device, such as a quartz oscillator, that may provide timing information to modulator 310 for encoding bits for transmission and may provide the timing information to demodulator 312 for decoding received signals from quantum wells 206. In particular, clock 315 may provide an indication of the time duration needed for transmitting a bit, e.g., an indication of how long each of quantum wells 206 should be held in a non-reflective state in order to encode a single 0 bit, or an indication of the time duration for decoding each signal received from quantum wells 206.

Memory 320 may include a random access memory (RAM) or another dynamic storage device, a read only memory (ROM) or another type of static storage device, and/or some other type of magnetic or optical recording medium and its corresponding drive that stores data for transmission by modulator 310, or that stores data received from incoming beam 106 and demodulated by demodulator 312. The data may include an arbitrary message (e.g., the readings of one or more sensor values) or control traffic (e.g., transmission control protocol (TCP) acknowledgement packets). Memory 320 may also store information and instructions for execution by processor 325.

Processor 325 may include any type of conventional processor or microprocessor that interprets and executes instructions. Processor 325 may control operation of device 302.

Power source 350 may include a battery, fuel cell, solar collector, or any other device capable of powering components of device 302.

MAC Layer

A medium access control (MAC) layer, consistent with the present invention, governs which device, of a group of devices, has access to a shared medium. In implementations consistent with the principles of the invention, the shared medium may be incoming beam 106. In implementations of the invention, the MAC layer may help govern which one of the retro-reflectors 104 receives incoming beam 106 and a duration of time that the one of the retro-reflectors 104 receives incoming beam 106. The MAC layer may allow a proportion of time to be devoted to incoming bits (from probe device 102 to retro-reflector 104) and a remainder of the time to be devoted to outgoing bits (from retro-reflector 104 to probe device 102). Implementations of the invention allow the proportion to be established as desired, in a flexible manner that may be changed on-the-fly, and that may be different for each of retro-reflectors 104.

As an example, retro-reflector "A" may receive incoming beam 106 for five milliseconds, then retro-reflector "B" may receive incoming beam 106 for twenty milliseconds, then retro-reflector "A" may receive incoming beam 106 again for five milliseconds, followed by retro-reflector "C", which may receive incoming beam 106 for ten milliseconds, and so forth. Some retro-reflectors 104 may have a relatively large amount of data to send or receive and therefore, may require a relatively large portion of time for receiving incoming beam 106. Other retro-reflectors 104 may have a relatively small amount of data to send or receive and therefore, may require incoming beam 106 less frequently. Some retro-reflectors 104 may require a large proportion of their share of incoming beam 106 to be devoted to incoming data, while other retro-reflectors may require a large proportion of their share of incoming beam 106 to be devoted to outgoing data.

In some implementations, one or more retro-reflectors 104 may enter a low-power state (go to sleep) when they are not actively sending or receiving in order to extend battery life. Enough information may be provided to retro-reflectors 104, such that each of the retro-reflectors 104 may know when it will be active next. Thus, one or more retro-reflectors 104 may sleep until a next active time.

Exemplary MAC Layer Frame Structure

Figure 4A:
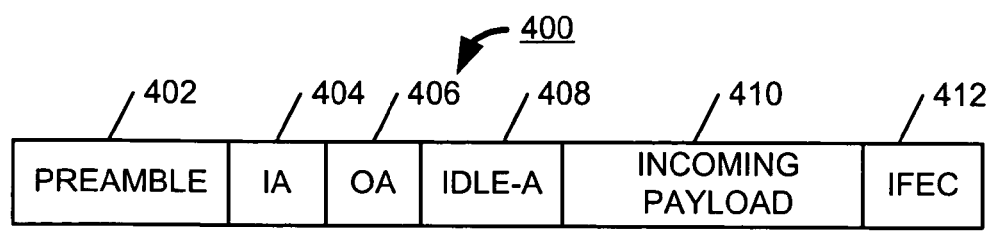
FIGS. 4A and 4B show exemplary formats of an incoming frame and an outgoing frame, respectively, used in communications between a remote device and a retro-reflector.
Figure 4B:
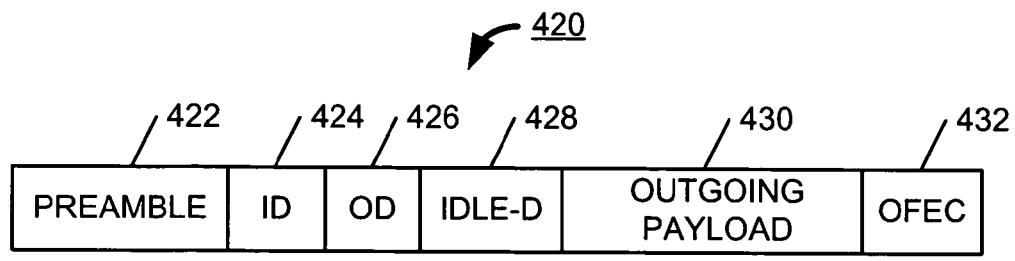

FIGS. 4A and 4B illustrate an exemplary MAC layer frame structure, consistent with the present invention. FIG. 4A shows exemplary incoming frame 400, which may be used for communications from probe device 102 to retro-reflector 104 (incoming communications). FIG. 4B shows an exemplary outgoing frame 420, which may be used for communications from retro-reflector 104 to probe device 102 (outgoing communications).

As illustrated by FIG. 4A, incoming frame 400 may include a preamble 402, an IA field 404, an OA field 406, an idle-A field 408, an incoming payload field 410 and an IFEC field 412.

Preamble 402 may include synchronization patterns that allow retro-reflector 104 to establish bit boundaries of a received message in incoming beam 106. Preamble 402 may also include a probe device identifier, such as a unique identifier of a given probe device 102 and/or an identifier of a given retro-reflector 104.

IA field 404 may indicate an incoming actual allocation (i.e., a number of bits retro-reflector 104 may be permitted to receive) to retro-reflector 104.

OA field 406 may indicate an outgoing actual allocation (i.e., a number of bits retro-reflector 104 may be permitted to transmit) to retro-reflector 104.

Idle-A field 408 may indicate an amount of time until a next frame from probe device 102 for a particular retro-reflector 104. Retro-reflector 104 may use a value of idle-A field 408 to determine how long retro-reflector 104 may sleep.

Incoming payload field 410 may include message bits from probe device 102 to retro-reflector 104.

IFEC field 412 may be a forward error correction code or checksum that may cover IA field 404, OA field 406, idle-A field 408 and incoming payload field 410. In some implementations, IFEC field 412 may also cover other content of frame 400, such as, for example, the probe device identifier, the retro-reflector identifier, or any other useful information that may be included in incoming frame 400. The forward error correction code included in IFEC 412 may include a cyclic redundancy check, a checksum, or the like.

Outgoing frame 420, as illustrated in FIG. 4B, is an exemplary frame format for communications from retro-reflector 104 to probe device 102 (outgoing communications). Outgoing frame 420 may include a preamble 422, an ID field 424, an OD field 426, an idle-D field 428, an outgoing payload field 430 and an OFEC field 432.

Preamble 422 may be similar to preamble 402. Alternatively, because reflected beam 108 may be much weaker than incoming beam 106, preamble 422 may be quite different from preamble 402. For example, preamble 422 may be much longer than preamble 402.

ID field 424 may indicate an input rate desired by retro-reflector 104, for example, a number of desired incoming bits requested by retro-reflector 104 for a subsequent time interval. The time interval may be any amount of time, for example, one second, one minute, one hour, one millisecond, etc. For example, if the time interval is one second, then ID field 424 may indicate a number of bits that retro-reflector 104 desires to receive in a coming one second time period.

Similar to ID field, 424, OD field 426 may indicate an output rate desired by retro-reflector 104, for example, a number of bits that retro-reflector 104 may desire to send in the same subsequent time interval. Idle-D field 428 may indicate a time interval between incoming frames desired by retro-reflector 104. A large value in idle-D field 428 may indicate that retro-reflector 104 desires to communicate less frequently, while a small value may indicate that retro-reflector 104 desires to communicate more frequently.

Outgoing payload field 430 may include outgoing message bits from retro-reflector 104 to probe device 102. If the message bits are fewer than an amount of bits allocated for outgoing payload field 430, then outgoing payload field 430 may be, for example, padded with blank values or outgoing payload field 430 may simply be shorter than the allocated length.

OFEC field 432 may include a forward error correction. OFEC field 432 may cover ID field 424, OD field 426, idle-D field 428, and outgoing payload field 430. In some implementations, OFEC field 432 may cover portions of preamble 422 or any other useful information included in frame 420. The forward error correction technique employed for OFEC field 432 may be the same technique used for IFEC 412. Alternatively, because reflected beam 108 may be much weaker than incoming beam 106, a different forward error correction technique may be employed.

A frame set, as described herein, includes an incoming frame and an outgoing frame sent in response to the incoming frame. For example, probe device 102 may transmit incoming beam 106, including incoming frame 400, to retro-reflector 104, which responds with outgoing frame 420 in reflected beam 108. Incoming frame 400 and outgoing frame 420 sent in response to receiving incoming frame 400, therefore, comprise a frame set. In some implementations, a short "dead" interval may exist between an incoming frame and an outgoing frame of a frame set. The short "dead" interval may provide retro-reflector 104 with time to switch from a detection (input) mode to a reflection (output) mode. In other implementations, retro-reflectors 104 may be capable of transmitting and receiving data simultaneously (for example, two different frequencies may be present in incoming beam 106). In such implementations, incoming frame 400 and outgoing frame 420, respectively, may be received by and sent from retro-reflector 104, simultaneously, instead of serially.

In practice, IA field 404 and OA field 406 may not govern payload sizes for a current frame set because of possible hardware timing considerations. Thus, in an alternative implementation, IA field 404 and OA field 406 may govern payload sizes for a next set frame set.

Different retro-reflectors 104 may employ different types of preambles 402, 422 and/or forward error correction, IFEC 412, OFEC 432. For example, some retro-reflectors 104 may be larger than others or may be in a better position than others. Such retro-reflectors 104 may be able to use shorter preambles 402, 422 and fewer forward error correction bits. The decision may be made based on retro-reflector type or expected location of retro-reflector 104. Alternatively, preambles 402, 422 and forward error correction codes, OFEC 432 and IFEC 412, may be adjusted on demand based, for example, on a detected error rate. For example, all retro-reflectors 104 may begin with very long preambles 402, 422 and forward error correction codes, OFEC 432 and IFEC 412. The length of preambles 402, 422 and forward error correction codes, OFEC 432 and IFEC 412, for all retro-reflectors 104 or for particular ones of retro-reflectors 104 may be shortened or lengthened based on detected error rates of retro-reflectors 104. For example, preambles 402, 422 and forward error correction codes, OFEC 432 and IFEC 412, of retro-reflectors 104 having low detected error rates may be adjusted to be shorter, while preambles 402, 422 and forward error correction codes, OFEC 432 and IFEC 412, of retro-reflectors 104 having a high detected error rate may be adjusted to be longer.

Exemplary Processing

Figure 5:
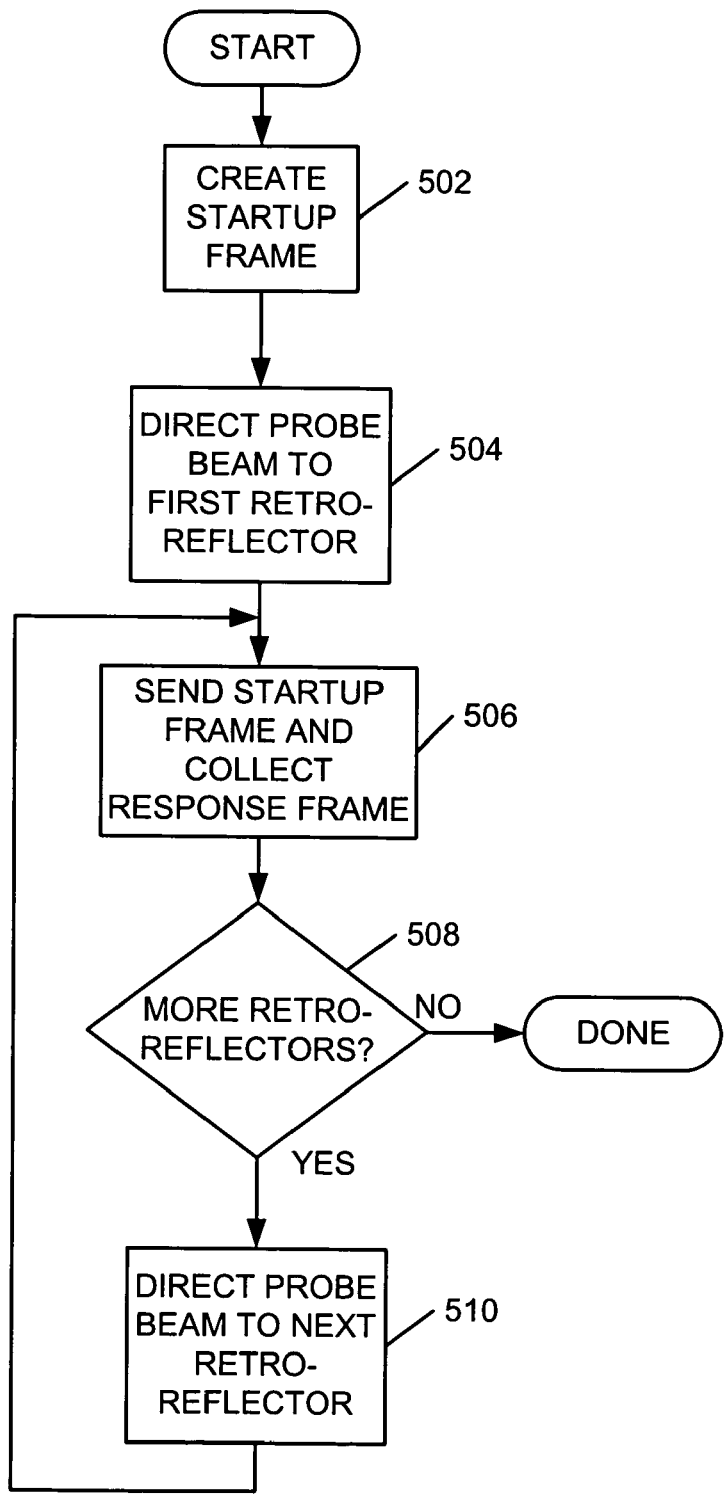
FIGS. 5 and 6 illustrate exemplary processing in implementations consistent with the principles of the invention.

FIG. 5 is a flowchart that illustrates exemplary processing for beginning communications among probe device 102 and a group of retro-reflectors 104, consistent with principles of the invention. Probe device 102 may begin by creating a "startup" frame. The "startup" frame may have the form of incoming frame 400 (FIG. 4A) (act 502). The "startup" frame may have no incoming data in incoming payload field 410, but may have a non-zero value in OA field 406 to inform retro-reflector 104 of a permitted output allocation for the next frame set. Further, the "startup" frame may have a non-zero value in idle-A field 408 to inform retro-reflector 104 when retro-reflector 104 will again receive input beam 106, including incoming frame 400, from probe device 102. For example, the "startup" frame may have a value of "1" in idle-A field 408 and a value of "20" in OA field 406. Thus, in this example, retro-reflector 104 may be informed that the next input beam 106 will be received in one time unit (milliseconds, seconds, minutes, hours, etc.) and that retro-reflector 104 will be permitted, in the next frame set, to send an outgoing message up to 20 size units (bits, bytes, blocks, etc.).

Probe device 102 may direct incoming beam 106 to a first retro-reflector 104 (act 504) and may send the "startup" frame to that retro-reflector 104 (act 506). Upon receiving an error-free or error corrected (via the forward error correction code) "startup" frame, retro-reflector device 302 may examine idle-A field 408 to determine when retro-reflector 104 will again receive incoming frame 400. Retro-reflector device 302 may also examine OA field 406 to determine a size of an outgoing message that retro-reflector 104 is permitted to send in the next frame set and may examine IA field 404 to determine a size of an incoming message that retro-reflector 104 may receive in the next frame set. Assuming that the "startup" frame is received without errors or is corrected of errors, retro-reflector 104 may create and send a "startup response" frame in the form of outgoing frame 420 (FIG. 4B). The "startup response" frame may not include message bits in outgoing payload field 430, but may indicate a desired input data rate in ID field 424, a desired output data rate in OD field 426, and a desired time interval until retro-reflector 104 again receives incoming beam 106 including incoming frame 400. Retro-reflector device 302 may determine a value for OD field 426 and idle-D field 428 based on an amount of data that retro-reflector device 302 may have waiting to be transmitted to probe device 102. Probe device 102 receives the "startup response" frame (act 506).

After sending the "startup" frame to a first retro-reflector 104, probe device 102 may determine whether there are any other retro-reflectors 104 to which a "startup" frame should be sent (act 508). In some implementation, a number of retro-reflectors 104 and corresponding locations may be known in advance. If probe device 102 determines that there are no additional retro-reflectors 104, then the process is completed. Otherwise, probe device 102 may direct incoming beam 106 to a next retro-reflector 104 (act 510) and processing continues at act 506.

After executing the processing of FIG. 5, probe device 102 has collected desired output and input allocations for a next time period and a desired time interval between frames from all retro-reflectors 104. Assuming that a value in idle-A field 406 in the last frame sent to each particular one of retro-reflectors 104 governs the schedule for the next frame set for each particular one of the retro-reflectors 104, the schedule for the next round of frames is already determined. However, probe device 102 may create a new schedule for the following round of frames. Probe device 102 may create the schedule by taking into account, for example, desired input data from ID field 424 and desired output data from OD field 426 collected from each of retro-reflectors 104, an amount of time needed to steer incoming beam 106 from one retro-reflector 104 to another retro-reflector 104, an incoming beam 106 duty cycle, urgent data that requires immediate transmission, etc. A resulting schedule may give a number of short intervals at rapid repetition rates to some retro-reflectors 104, interspersed with longer intervals to other retro-reflectors 104. Probe device 102 may arbitrarily vary the schedule according to the needs of individual retro-reflectors 104 and the collection as a whole.

Figure 6:
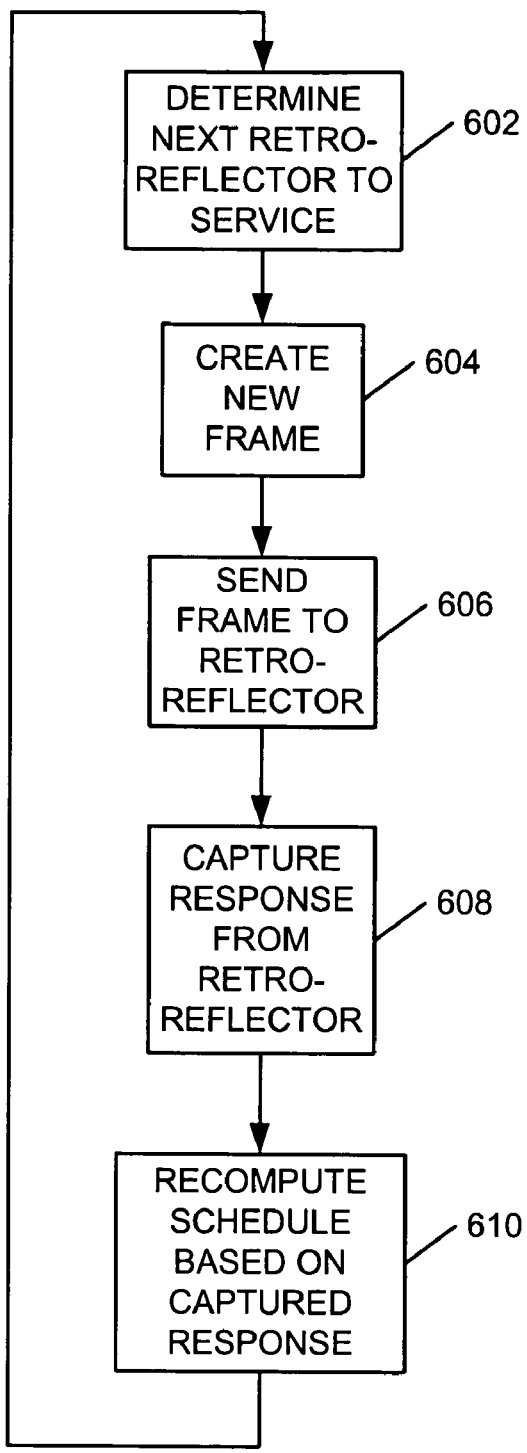

FIG. 6 is a flowchart that illustrates exemplary processing that may be performed consistent with the principles of the invention. Assuming that the processing described in FIG. 5 has been performed and that probe device 102 created a schedule, as described above, probe device 102 may begin by consulting the schedule to determine which one of the retro-reflectors 104 is to be serviced next and when that retro-reflector 104 is to be serviced (act 602). Probe device 102 may then create a new incoming frame 400 (act 604). Probe device 102 may include appropriate values for fields IA 404, OA 406, idle-A 408, and incoming payload 410. The values for fields IA 404, OA 406 may be derived from the schedule, while incoming payload 410 may be derived by messages that probe device 102 has that are waiting for delivery to retro-reflector 104.

At the scheduled time, probe device 102 may send incoming frame 400 to the next retro-reflector 104 via incoming beam 106 (act 606). Retro-reflector 104 may then send a message in outgoing payload field 430 of outgoing frame 420 of a size that may be limited based on the allocated outgoing size limit, as specified by probe device 102 in OA field 406 of incoming frame 400 of an immediately preceding frame 400 sent to retro-reflector 104. Probe 102 may capture the response frame 420 from retro-reflector 104 (act 608). Retro-reflector 104 may set values in fields ID 424, OD 426 and idle-D 428 of outgoing frame 420 according to a desired amount of input, a desired amount of output, and a desired schedule time interval, respectively. Probe 102 may have already determined a next scheduled time interval for retro-reflector 104 as indicated by the value of idle-A field 408 of incoming frame 400 sent to retro-reflector 104. Probe device 102 may consider the values of fields ID 424, OD 426 and idle-D 428 of frame 420 of the current received frame 420 when scheduling a future interval, for example, the interval after the next interval (act 610). Probe device 102 may again perform acts 602-610 for a next scheduled retro-reflector 104.

In implementations consistent with the principles of the invention, the schedule may be recalculated after every frame set. Consequently, the access control scheme may be highly responsive to events. For example, if a sensor attached to retro-reflector 104 detects something of interest, retro-reflector 104 may request a schedule change from a relatively leisurely schedule, for example, a few bits every ten seconds, to a much more demanding schedule, such as, for example, 10,000 bits every second. Retro-reflector 104 may request the schedule change by indicating the desired schedule change via idle-D field 428, and the desired data rate change via ID field 424 and OD field 426.

CONCLUSION

Systems and methods consistent with the principles of the invention perform a medium access control scheme for organizing and scheduling sending and receiving of messages between a probe device and each retro-reflector from a group of retro-reflectors. According to exemplary embodiments, each retro-reflector device may sleep until a next scheduled time for receiving an incoming beam from the probe device. The received incoming beam may have data encoded and modulated onto the beam. The retro-reflector may sense this data, which may include scheduling information for a later communication with probe device 102. When the retro-reflector device receives the incoming beam, the retro-reflector may receive an incoming message and may send an outgoing message, along with desired scheduling information and desired input and output rate information, which may be considered by the probe device when recalculating a new schedule.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while a series of acts have been described with regard to FIGS. 5-6, the order of the acts may differ in other implementations consistent with the present invention. Also, non-dependent acts may be performed in parallel. Further, the acts of FIGS. 5-6 are exemplary. In some implementations, consistent with the present invention, some of the acts may be omitted, while in other implementations, additional acts may be included. In addition, certain portions of the invention may be implemented as "logic" that performs one or more functions. This logic may include hardware, such as an application specific integrated circuit, a field programmable gate array and/or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A communication method for a retro-reflector device, the method comprising:
receiving, at the retro-reflector device, a first frame encoded in an input beam;
creating and sending, from the retro-reflector device, a second frame in a first reflected beam, the first reflected beam being formed by the retro-reflector device reflecting the input beam along a path closely aligned with a path of the input beam, wherein
at least one of the first frame or the second frame includes medium access control information;
receiving, at a plurality of retro-reflector devices, respective first frames encoded in respective input beams;
creating and sending, from the plurality of retro-reflector devices, respective second frames in respective first reflected beams formed by each of the plurality of retro-reflector devices reflecting the respective input beam along a path closely aligned with a respective path of the respective input beam, wherein for each of the retro-reflector devices, at least one of the respective first frame or the respective second frame includes medium access control information;

including, in at least some of the respective first frames, an indication of a data rate for a message within one of the at least some of the respective first frames and at least some of the respective second frames; and wherein the indication of the data rate for one retro-reflector device is different than the indication of the respective data rate for another retro-reflector device.

2. The communication method of claim 1, further comprising:

receiving, at the retro-reflector device, a first frame including time information encoded in an input beam.

3. The communication method of claim 2, wherein:

the time information is schedule information including an indication of a next time when the retro-reflector device is to receive another frame, and the communication method further comprises:

receiving, at the retro-reflector device, the another frame encoded in an input beam at the next time, as indicated by the schedule information included in the first frame.

4. The communication method of claim 1, further comprising:

encoding and modulating message bits into the first frame.

5. The communication method of claim 1, further comprising:

including, in the first frame, an indication of a data rate for a message within one of the first frame or the second frame.

6. The communication method of claim 1, further comprising:

including, in the first frame, an indication of an amount of data for a message within one of the first frame or the second frame.

7. The communication method of claim 1, wherein at least one of the retro-reflector devices receives a respective plurality of input beams more frequently than at least one other of the retro-reflector devices receives a respective plurality of input beams.

8. The communication method of claim 1, further comprising:

including, in at least some of the respective first frames, an indication of an amount of data for a message within one of the at least some of the respective first frames and at least some of the respective second frames.

9. The communication method of claim 1, wherein:

each of the first frames includes a first preamble and each of the second frames includes a second preamble.

10. The communication method of claim 9, wherein:

the first preambles are different than the second preambles.

11. The communication method of claim 1, wherein:

each of the first frames includes a first preamble and each of the second frames includes a second preamble, and the first and the second preambles for communications between a remote device and one of the retro-reflector devices is different than the first and the second preambles for communications between the remote device and at least one other of the retro-reflector devices.

12. The communication method of claim 1, wherein:

each of the first frames includes a first forward error correction code.

13. The communication method of claim 1, wherein:

each of the second frames include a forward error correction code.

14. The communications method of claim 13, wherein:

each of the second frames includes a second forward error correction code, and in communications between a remote device and at least one of the retro-reflector devices, the first forward error correction codes are different than the second forward error correction codes.

15. The communication method of claim 1, the second frame includes desired future time information for receiving an input beam from a remote device.

16. The communication method of claim 1, wherein the second frame includes a desired data rate for sending data from the retro-reflector device.

17. The communication method of claim 1, wherein the second frame includes a desired data rate for receiving data.

18. The communication method of claim 5, further comprising:

including, in the second frame, the message having an amount of data that is limited based on the indication of the data rate.

19. A communication method for a retro-reflector device, the method comprising:

receiving, at the retro-reflector device, a first frame encoded in an input beam;

creating and sending, from the retro-reflector device, a second frame in a first reflected beam, the first reflected beam being formed by the retro-reflector device reflecting the input beam along a path closely aligned with a path of the input beam, wherein at least one of the first frame or the second frame includes medium access control information;

receiving, at a plurality of retro-reflector devices, respective first frames encoded in respective input beams;

creating and sending, from the plurality of retro-reflector devices, respective second frames in respective first reflected beams formed by each of the plurality of retro-reflector devices reflecting the respective input beam along a path closely aligned with a respective path of the respective input beam, wherein for each of the retro-reflector devices, at least one of the respective first frame or the respective second frame includes medium access control information;

wherein at least some of the respective second frames include a desired future time interval for receiving a frame in an input beam; and informing each of the retro-reflector devices of a scheduled time, based at least in part on the desired future time intervals, by sending an indication of a next time interval, to each of the retro-reflector devices, via an input beam.

20. A retro-reflector device comprising:

a receiving portion configured to receive an incoming beam from a device and to decode a first frame encoded in the incoming beam, the first frame including an indication of a next time for the retro-reflector device to receive an incoming beam; and a reflecting portion configured to form a reflected beam by reflecting the incoming beam along a path closely aligned with a path of the incoming beam and to encode a second frame in the reflected beam; and wherein a transmission rate of data included in the second frame is determined by a data rate indication in the first frame.

21. The retro-reflector device of claim 20, wherein the first frame includes a data rate for communications between a device and the retro-reflector device, the data rate providing a limit on an amount of data that can be sent from at least one of the device to the retro-reflector device or the retro-reflector device to the device, over a given time period.

22. The retro-reflector device of claim 20, wherein the first frame includes an indication of an amount of data for a message between a device and the retro-reflector device.

23. The retro-reflector device of claim 20, wherein an amount of data included in the second frame is determined by an amount of data indication in the first frame.

24. The retro-reflector device of claim 20, wherein the first frame includes an incoming message portion for a message from the device to the retro-reflector device.

25. The retro-reflector device of claim 20, wherein the second frame includes a desired future time interval for receiving the incoming beam.

26. The retro-reflector device of claim 20, wherein the first frame includes an incoming message portion for a message to the retro-reflector device and the second frame includes an outgoing message portion for a message from the retro-reflector device.

27. The retro-reflector device of claim 20, wherein:
the retro-reflector device is configured to enter a low-power mode after receiving the indication in the first frame, the retro-reflector device remaining in the low-power mode until approximately the next time.

28. The retro-reflector device of claim 20, wherein:
the receiving portion is configured to receive a first preamble included in the first frame.

29. The retro-reflector of claim 28, wherein:
the reflecting portion is configured to encode a second preamble in the second frame.

30. The retro-reflector of claim 29, wherein:
the first preamble is different than the second preamble.

31. The retro-reflector device of claim 20, wherein:
the receiving portion is configured to receive a first error correcting code included in the first frame.

32. The retro-reflector device of claim 20, wherein:
the reflecting portion is configured to encode a second error correcting code in the second frame.

33. The retro-reflector device of claim 31, wherein:
the reflecting portion is configured to encode a second error correcting code in the second frame, and
the first error correcting code is different from the second error correcting code.

34. The retro-reflector device of claim 20, wherein the incoming beam and the reflected beam include light waves.

35. The retro-reflector device of claim 20, wherein the incoming beam and the reflected beam include radio frequency waves.

36. The retro-reflector device of claim 20, wherein the incoming beam and the reflected beam include acoustic waves.

37. The retro-reflector device of claim 34, wherein:
the retro-reflector device includes a cat's eye retro-reflector.

38. The retro-reflector device of claim 37, wherein:
the reflecting portion includes at least one quantum well, a surface of the at least one quantum well being configured to have varying reflectivity, such that the second frame may be encoded in the reflected beam by changing the reflectivity of at least one of the quantum wells while the incoming beam is hitting the one of the quantum wells.

39. The retro-reflector device of claim 38, wherein:
the at least one quantum well includes a positive-intrinsic-negative diode, such that the at least one quantum well is configured to detect the light waves.

40. A device configured to send an incoming beam to at least one retro-reflector device, the device comprising:
a transmitter configured to provide a carrier as an incoming beam to the at least one retro-reflector device and to encode a first frame onto the carrier; and
a receiver configured to receive and decode a reflected beam from the at least one retro-reflector device, the reflected beam including a second frame, wherein:
one of the first frame or the second frame includes medium access control information;
the first frame includes time information indicating a next time when the device will direct the incoming beam to the at least one retro-reflector device;
the second frame includes a desired time period when the at least one retro-reflector device desires to transmit or receive data, and
the device is further configured to consider the desired time period before generating a new time information for a next first frame to be sent to the at least one retro-reflector device.

41. The device of claim 40, wherein:
the time information is derived from a schedule.

42. The device of claim 40, wherein:
the first frame includes an indication of a limit of an amount of data permitted between the remote device and the at least one retro-reflector device during a given time period.

43. The device of claim 42, wherein:
the indication of the limit pertains to incoming data from the device to the at least one retro-reflector device.

44. The device of claim 42, wherein:
the indication of the limit pertains to outgoing data from the at least one retro-reflector device to the device.

45. The device of claim 40, wherein:
the first frame includes a first preamble.

46. The device of claim 40, wherein:
the second frame includes a preamble.

47. The device of claim 45, wherein:
the second frame includes a second preamble, and
the first preamble is different than the second preamble.

48. The device of claim 40, wherein:
the first frame includes a first error correcting code.

49. The device of claim 48, wherein:
the second frame includes a second error correcting code, and
the first error correcting code is different than the second error correcting code.

50. The device of claim 40, wherein:
the second frame includes a second error correcting code.

51. A system for controlling communications, the system comprising:
a probe device configured to send a first frame modulated onto a carrier as an incoming beam; and
a plurality of retro-reflector devices, each of the retro-reflector devices being configured to receive the first frame, encode and modulate a second frame onto a reflected beam, and transmit the second frame to the probe device, wherein:
each of the retro-reflector devices is configured to encode and modulate the second frame onto the reflected beam, responsive to receiving the first frame in the incoming beam, and
one of the first frame or the second frame includes medium access control information;
each of the retro-reflector devices is further configured to include, in a respective second frame, a next desired time for receiving another frame; and
the probe device is configured to collect the next desired times in the second frames from the retro-reflector devices, create a schedule based on the next desired times, and transmit a new time information in a frame to each respective one of the retro-reflector devices.

52. The system of claim 51, wherein:
the first frame includes time information indicating when a respective one of the retro-reflector devices will next receive the incoming beam.

53. The system of claim 52, wherein:
the respective one of the retro-reflector devices is further configured to enter a low-power mode after receiving the time information and to remain in the low power mode for a period based on the time information.

54. The system of claim 51, wherein:
the retro-reflector devices are configured to include a preamble in the second frame.

55. The system of claim 54, wherein:
the preamble from one of the retro-reflector devices is different than the preamble from at least one other of the retro-reflector devices.

56. The system of claim 51, wherein:
the retro-reflector devices are configured to include an error correcting code in the second frame.

57. The system of claim 56, wherein:
the error correcting code from one of the retro-reflector devices is different than the error correcting code from at least one other of the retro-reflector devices.

* * * * *